United States Patent [19]
Taira et al.

[11] Patent Number: 6,026,072
[45] Date of Patent: *Feb. 15, 2000

[54] OPTICAL DISK AND METHOD OF MANUFACTURING THE SAME

[75] Inventors: Kozo Taira, Machida; Toshiyuki Nakano, Yokohama; Masaaki Matsumaru, Funabashi, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/879,301

[22] Filed: Jun. 19, 1997

[30] Foreign Application Priority Data

Jun. 21, 1996 [JP] Japan ..................... 8-179806
Feb. 25, 1997 [JP] Japan ..................... 9-040550

[51] Int. Cl.⁷ ...................................... G11B 7/00
[52] U.S. Cl. ..................... 369/275.3; 369/275.4
[58] Field of Search .............. 369/275.4, 275.3, 369/275.1, 59, 44.26, 118, 44.23, 109

[56] References Cited

U.S. PATENT DOCUMENTS 5,040,165  8/1991  Taii et al. .
5,200,941  4/1993  Matoba et al. ................ 369/44.26

FOREIGN PATENT DOCUMENTS 229 035 A2  7/1987  European Pat. Off. .
7-320308  12/1995  Japan .

OTHER PUBLICATIONS

Patent Abstracts of Japan, vol. 015, No. 492 (P–1287), Dec. 1991 re JP–03–212831A.
Patent Abstracts of Japan, vol. 015, No. 372 (P–1254), Sep. 1991 re JP–03–144933A.

*Primary Examiner*—Thang V. Tran
*Attorney, Agent, or Firm*—Pillsbury Madison & Sutro LLP

[57] ABSTRACT

An optical disk comprises a mark train, which has at least one shortest mark and at least one other mark, recording readable information by applying a light beam, wherein the shortest mark of the mark train have a width larger than that of the other mark.

12 Claims, 7 Drawing Sheets

OPTICAL DISK AND METHOD OF MANUFACTURING THE SAME

BACKGROUND OF THE INVENTION

The present invention relates to an optical disk having information stored in high density in the form of a mark train such as a pit train, and also a method of manufacturing the optical disk by using a master.

An optical disk is a recording medium on which information has been recorded in the form of a mark train, such as a pit train. The information can be read by applying a light beam onto the recording surface of the optical disk. The optical disk attracts much attention because it can work as a memory for storing a great amount of information in high density. Actually it has been used as a memory in various data-processing systems such as personal computers, and also as a medium recording audio and video signals. Research and development are undergoing to provide an optical disk which can store more information in higher density.

How optical disks are manufactured will be briefly described. First, the master is plated. Using the master thus plated, a stamper is made. Next, the stamper is used, fabricating a number of disk substrates by means of injection molding. A reflecting film made of, for example, aluminum is formed on each disk substrate, and a recording film such as a phase-changing film or a photomagnetic film is formed on the reflecting film. An optical disk is thereby manufactured. Generally, the master is manufactured as follows. First, photoresist is coated on a glass substrate. Then, a laser beam focused by an objective lens is applied to the photoresist. While being applied to the photoresist, the beam has its power modulated in accordance with signals representing the information which is to be recorded on the optical disk. The photoresist exposed to the laser beam is developed with an etchant, whereby pit trains representing the information are formed in the photoresist. The master is thereby manufactured. Alternatively, the light beam may be continuously applied to the photoresist, maintaining a constant power, and the photoresist may be developed with an etchant. In this case, a groove will be formed in the photoresist.

Any optical disk made by using a stamper fabricated by using a master which has a pit train has an identical pit train in the surface of its reflecting film. On the other hand, any optical disk made by using a stamper prepared by using a master which has a groove has a groove in the surface of its recording film. The groove serves as a tracking guide. An exposure light beam may be applied to the recording film, along the groove, forming a mark train (e.g., pits), thus recording information on the recording film of the optical disk.

In order to reproduce information from an optical disk on which the information has been thus recorded, a reproducing light beam is applied to the optical disk. A photodetector detects the beams reflected from the pits and converts the beams into information signals. Hitherto used as the reproducing beam is one emitted from a red-emitting laser. An objective lens focuses the red laser beam. The laser beam is applied to the optical disk, forming thereon a beam spot having a diameter of about 1 $\mu$m. In this case, it is possible to reproduce the information which is recorded on the optical disk in the form of pits having a width of about 0.3 to 0.4 $\mu$m.

To record information in high density on an optical disk, pits must be formed in the surface of the optical disk in smaller size at shorter intervals between the pits. To reproduce the information recorded in high density, that is, in the form of small pits at short intervals, the reproducing beam must have a small diameter. To achieve these requirements, short-wave lasers, such as an SHG laser element and a blue laser element, are being developed. It is expected that beams emitted from these short-wave lasers can be focused to have a diameter of sub-micron order.

An optimal relationship exists between the diameter of a beam spot and the pit length formed in the surface of an optical disk. Signals having a maximum amplitude will be generated if the pit length is larger than the diameter of the beam spot, provided that the pits have a width about one third the diameter of the beam spot. A blue laser beam can be focused to have its diameter reduced to about 0.6 $\mu$m, depending on the optical characteristics of the objective lens used. To reproduce information signals having a maximum amplitude, the pits formed in the surface of the optical disk need to have their width decreased to about 0.2 $\mu$m.

As indicated above, the pits in the surface of an optical disk must be small to record information in high density on the optical disk. However, if the pits are arranged at intervals shorter than the diameter of the spot the reproducing beam forms on the surface of the disk, the MTF (Modulation Transfer Function) will decrease. This inevitably reduces the amplitude of the signals reproduced from the optical disk. The shortest pit formed in the disk surface may have the same length approximately equal to or less than the diameter of the beam spot. It may therefore be narrower than any longer pit. If so, the signal generated from the beam reflected from the shortest pit will be extremely reduced.

As described above, small pits may be formed to record information in high density on an optical disk, and a short-wave reproduction beam having a small diameter may be applied to the disk having pits to reproduce information from the disk. In this case, the signal generated from a beam reflected from the shortest pit has an amplitude far smaller than desired. Having an insufficient amplitude, the signal is likely to have increased jitter or to result in an increase of error rate. Ultimately the signal will greatly lower the reliability of the optical disk system in which the disk is used.

BRIEF SUMMARY OF THE INVENTION

An object of the present invention is to provide an optical disk on which information is recorded in high density in the form of a mark train such as pits, and which can provide a signal having a sufficient amplitude even if generated from a light beam reflected from a mark shorter than the diameter of the reproducing light beam applied to the disk.

Another object of the present invention is to provide a method of manufacturing an optical disk of this type, in which a mark train such as pits, representing information, is formed in the surface of a master, and the master thus made is used to manufacture the optical disk.

An optical disk according to the present invention comprises: a mark train, which has at least one shortest mark and at least one other mark, recording readable information by applying a light beam, wherein the shortest mark of the mark train have a width larger than that of the other mark.

In the optical disk, a pitch between two of shortest marks of the mark train is smaller than a diameter of a spot of the light beam for reading the mark train.

Another type of an optical disk according to this invention comprises: a mark train, which has at least one shortest mark and at least one other mark, recording readable information by applying a light beam, wherein each of marks of the mark train has a width which is inversely proportional to a length of the mark.

Still another type of an optical disk according to the present invention comprises: a mark train, which has at least one shortest mark and at least one other mark, recording readable information by applying a light beam, wherein each of marks of the mark train has a width which is inversely proportional to a length of the mark when the marks have lengths which are equal to or less than a diameter of a spot of the light beam for reading the mark train.

A further type of an optical disk according to the present invention comprises: a mark train, which has at least one shortest mark and at least one other mark, recording readable information by applying a light beam, wherein each of marks of the mark train has a width which is inversely proportional to a length of the mark, and each of the marks has the same width regardless of length thereof.

In the present invention, the shortest marks are broader than the longer marks. Alternatively, each of the marks may have a width which is inversely proportional to a length of the mark. Still alternatively, the shortest marks are arranged at a pitch smaller than a diameter of a spot the exposure light beam forms on the optical disk, and the marks have the same width and different lengths. The signals reproduced by applying a reproducing light beam to the shortest marks can have a sufficient amplitude. Namely, the broader each mark is, the larger the amplitude of the signal reproduced by applying the light beam to the mark, provided that the mark is longer than the diameter of the spot formed by the reproducing light beam. The conventional optical disk has marks, some of which are as short as the diameter of the reproducing beam spot. These short marks are likely to be narrower than the longer marks.

In the optical disk according to the present invention, the shortest marks are board enough to provide signals which have sufficient amplitudes.

Thus, signals having sufficient amplitudes can be reproduced from the optical disk of the present invention even if information is recorded on the disk in the form of marks which are relatively short. As a result, the margin for jitter in the signals increases, reducing the error rate. Therefore, this invention can serve to provide an optical disk system which reliably operates to read information recorded in high density.

If the marks are arranged at a pitch smaller than the diameter of the reproducing beam spot, the MTF of the disk will decrease. The decrease of the MTF results in a decrease in the amplitudes of the signals reproduced from the beams reflected from the marks. The influence of the mark pitch on the MTF is prominent, particularly for the shortest marks. Hence, the characteristics of the signals reproduced can be sufficiently improved by correcting the power of the exposure light beam, thereby forming shortest marks having an appropriate width. The signal-processing system used for forming marks with an appropriate width can therefore be simple in structure. This is a practical advantage of the present invention.

A method of manufacturing an optical disk, according to the present invention, comprises: a first step of applying a exposure light beam modulated in accordance with an information signal to be recorded, thereby forming a pit train in a master; and a second step of manufacturing an optical disk by using the master, the optical disk having a readable mark train, in which information is recorded, by applying a light beam to the optical disk, wherein the first step includes a substep of increasing power of the exposure light beam corresponding to shortest ones of marks to a value greater than power of the exposure light beam which corresponds to other marks.

In the method, the first step includes a substep of decreasing a pulse width of the exposure light beam which corresponds to shortest mark to a value less than a pulse width of the exposure light beam which corresponds to the other mark. Also in this method, the first step includes a substep of decreasing a pulse width of the exposure light beam which corresponds to all marks to a value less than a pulse width of the information signal.

The method can provide an optical disk having a mark train, including the shortest marks which are arranged at a pitch shorter than the diameter of a reproducing beam spot and which have a width larger than those of the other marks.

The exposure light beam applied to form the shortest marks has greater power than the light beam applied to form the other marks. Moreover, those pulse widths of the exposure light beam which correspond to the shortest marks are decreased to a value less than those pulse widths of the beam which correspond to the other marks. Alternatively, those pulse widths of the exposure light beam which correspond to the marks to a value less than the pulse widths of the information signal. As a result, the shortest marks can be broader, without being made longer than prescribed.

Another method of manufacturing an optical disk, according to this invention, comprises: a first step of applying a exposure light beam modulated in accordance with an information signal to be recorded, thereby forming a pit train in a master; and a second step of manufacturing an optical disk by using the master, the optical disk having a readable mark train, in which information is recorded, by applying a light beam to the optical disk, wherein the first step includes a substep of forming the mark train by maintaining power of the exposure light beam at a fixed value when $x/w>1$, and by multiplying the fixed value of power by $0.5\times\{(w/x)+1\}$ when $x/w\leq 1$, where w is a diameter of a spot which the exposure light beam forms on the optical disk when the power of the light beam is 10% of a peak power thereof, and x is a spatial distance on the master which corresponds to a pulse width of the information signal.

Since the power of the exposure light beam is thus controlled, mark can be formed, including relatively short marks which have widths larger than those of the other relatively long marks.

Still another method of manufacturing an optical disk, according to the present invention, comprises: a first step of applying a exposure light beam modulated in accordance with an information signal to be recorded, thereby forming a pit train in a master; and a second step of manufacturing an optical disk by using the master, the optical disk having a readable mark train, in which information is recorded, by applying a light beam to the optical disk, wherein, the first step includes a substep of forming the mark train by multiplying, when $x/w\leq 0.5$, the power which the exposure light beam have when $x/w>1$, by $0.5\times\{(w/x)+1\}$, where w is a diameter of a spot which the exposure light beam forms on the optical disk when the power of the exposure light beam is 10% of a peak power thereof, and x is a spatial distance on the master which corresponds to a pulse width of the information signal.

In this method, since an exposure light spot of the exposure light beam forms the mark train, the exposure light spot shortened in a tangential direction of the master, the shortest marks can have a width larger than those of the other marks. The exposure light spot shortened in the tangential direction has been obtained by passing a light beam through at least one super-resolution filter. The super-resolution filter has a stripe-shaped shield which extends in the tangential direction of the master (that is, along a line intersecting with the radius of the mater at right angles). Instead, the filter may be replaced by one which has an elliptical shield with a major axis extending in the tangential direction of the master. Thanks to the high-resolution effect of either filter, the exposure light beam can be changed to one which has a small elliptical cross section. The laser beam forms a small elliptical spot which extends along the radius of the master. This helps to provide optical disks on which information is recorded in high density.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Embodiments of the present invention will be described, with reference to the accompanying drawings. The embodiments are optical disks, each having a pit train formed as a mark train.

First Embodiment

Figure 1:
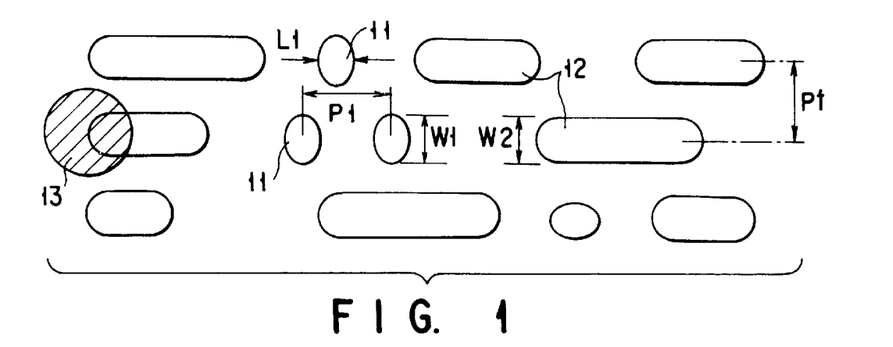
FIG. 1 is a diagram showing some shapes of the pits formed in the surface of an optical disk according to a first embodiment of the present invention.

FIG. 1 shows some shapes of the pits formed in the surface of the optical disk. An optical disk of this type can reproduce the information and cannot write the information. The optical disk comprises a resin substrate and a reflecting film provided on the resin substrate. Information is recorded in the form of pits, on that surface of the disk on which the reflecting film is provided. The pits are arranged either in concentric tracks or in a spiral track. As seen from FIG. 1, the pits 11 and 12 have different lengths. Among the pits 11 are the shortest ones (shortest pit).

The information is reproduced from the optical disk by receiving light beams reflected from the pits 11 and 12 by an optical head (not shown). The optical head may be the known type which comprises a semiconductor laser element (i.e., a light source), a collimator lens, a beam splitter, an objective lens, a focusing lens, and a photodetector. The semiconductor laser element emits a laser beam. The laser beam is applied to the objective lens through the collimator lens and the beam splitter. The objective lens focuses the laser beam. The beam focused is applied to the optical disk, forming a fine beam spot 13 (hereinafter referred to as "reproducing beam spot") on the optical disk, as illustrated in FIG. 1.

The reflected light reflected from the optical disk passes through the objective lens and reaches the beam splitter. The beam splitter splits the reflected light from the laser beam being applied toward the objective lens. The reflected light is applied to the photodetector through the focusing leans. The photodetector has a light-receiving surface comprises four photoelectric transducer elements. The four electric signals output from four photoelectric transducer elements of the photodetector are arithmetically processed, providing an information signal and an error signal. The error signal is used to achieve tracking servo and focusing servo.

The tracks provided on the optical disk are arranged at a pitch Pt of 0.74 $\mu$m, and the pits have lengths ranging from 0.4 to 1.5 $\mu$m. A length L1 of the shortest pits 11 has a predetermined value of 0.4 $\mu$m. The pits 11 and 12 are arranged at various pitch (any adjacent shortest pits 11 are arranged at a pitch P1 of 0.8 $\mu$m). The shortest pits 11 have a width W1 of 0.41 $\mu$m, whereas the other pits 12 have a width W2 of 0.4 $\mu$m. That is, W1>W2.

The semiconductor laser is, for example, a red laser having a wavelength of 650 nm. The objective lens has an NA (Numerical Aperture) of 0.6. The reproducing beam spot 13 has a diameter of about 0.9 μm, which is greater than the pitch P1 (=0.8 μm) at which any adjacent shortest pits 11 are arranged.

Figure 2:
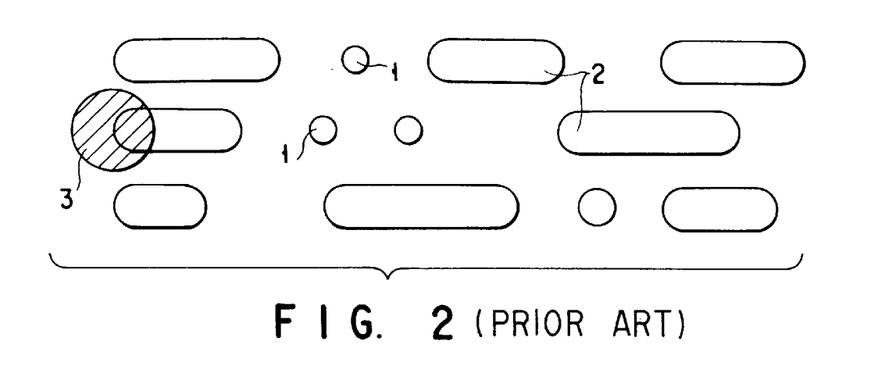
FIG. 2 is a diagram showing some shapes of the pits formed in the surface of a conventional optical disk.

FIG. 2 is a diagram showing some shapes of the pits formed in the surface of a conventional optical disk. The shortest pits 1 have a width of 0.35 μm, which is less than the width of 0.4 μm of the other pits 2. The parameters other than the width of the shortest pits 1 are substantially equal to those in the optical disk shown in FIG. 1.

As indicated above, the optical disk according to this invention differs from the conventional one in two respects. That is, (i) the pitch P1 of the shortest pits 11 is shorter than the diameter of the reproducing beam spot 13; and (ii) the width W1 of the shortest pits 11 is greater than the width W2 of the other pits 12. Hence, the signal generated from the light beam reflected from each shortest pit 11 can have a sufficient amplitude, despite that the information is recorded on the disk in considerably high density.

Information was reproduced from optical disks of the types shown in FIGS. 1 and 2. Eye-patterns of the signals reproduced from both types of optical disks were obtained. The eye-patterns revealed that the signals reproduced from the optical disk shown in FIG. 1, particularly those generated from the light beams reflected from the shortest pits 11, had larger amplitudes than the signals reproduced from the conventional optical disk shown in FIG. 2. In the embodiment, the shortest pit has a shape of an ellipse. The present invention is not limited this shape, the shortest pit may have a shape of a circle if the above requisite is satisfied.

The method of manufacturing the optical disk (FIG. 1) of the present invention will be described.

The optical disk of the present invention is manufactured in basically the same way as the conventional optical disk. That is, a master having pit trains on its surface is plated. Using the master thus plated, a stamper is made. The stamper is used, fabricating a number of disk substrates by means of injection molding. A reflecting film made of, for example, aluminum is formed on each disk substrate. However, the method of manufacturing the optical disk of this invention differs from the method of manufacturing the conventional optical disk, as will be described below.

The embodiment of the master recording apparatus for manufacturing the master, in which the pit trains are formed on the surface, will be described.

Figure 3:
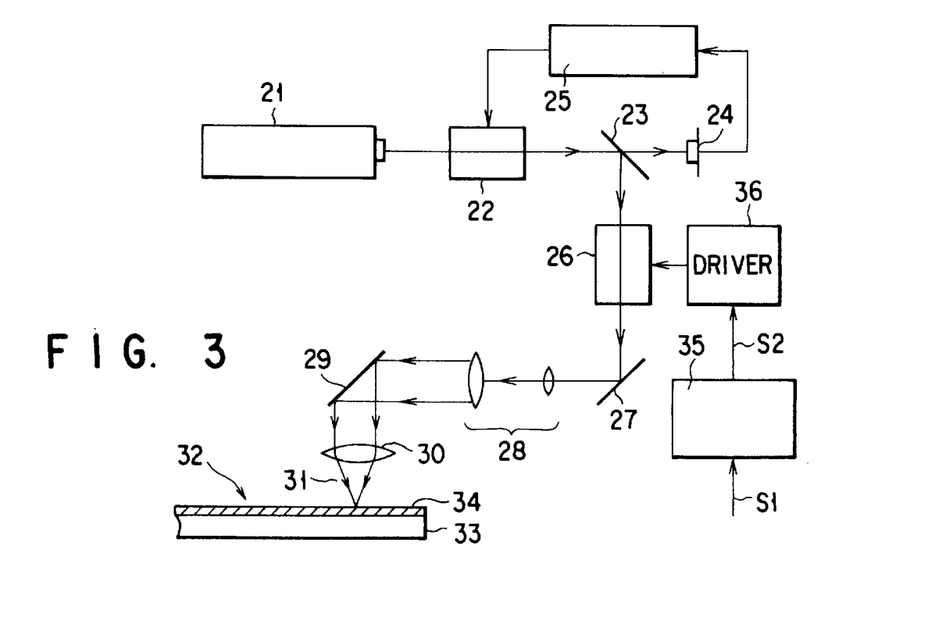
FIG. 3 is a block diagram of the recording optical system incorporated in an apparatus for manufacturing a master, according to the first embodiment of the present invention.

FIG. 3 is a block diagram of the recording optical system incorporated in the master recording apparatus. In the recording optical system, the laser generator 21 emits a laser beam, which is applied to the first light modulator 22. The light modulator 22 emits a beam to the half mirror 23. The half mirror 23 splits the beam into two laser beams. The first laser beam is applied to the power monitor photodetector 24, which monitors the power of the first beam and generates a signal representing the power detected. The output signal of the photodetector 24 is supplied to the light control system 25. The system 25 performs feedback control on the first light modulator 22 so that the first modulator 22 emits a beam having a constant power.

In the meantime, the second laser beam reflected by the half mirror 23 is applied to the second light modulator 26. The second light modulator 26 modulates the second laser beam in accordance with an information signal as will be explained later. The second laser beam emitted from second light modulator 26 is guided by the mirror 27 to the collimate system 28. The collimate system 28 shapes the beam to a parallel light beam. The shaped light beam is guide by the mirror 29 to the objective lens 30. The objective lens 30 provides a exposure laser beam 31 in which the light beam is focused to a desired spot diameter. The laser beam 31 is applied to a master 32. The master 32 comprises a disk-shaped glass substrate 33 and a photoresist 34 coated on the surface of the substrate 33. The photoresist 34 is exposed by the exposure laser beam 31.

The photoresist film 34 exposed by the laser beam 31 is developed with a suitable etchant. Pits are thereby formed in the photoresist film 34. The lengths and widths of the pits are determined by controlling the power of the laser beam 31 (adding the control of pulse width), thereby sizes and widths of pits formed by developing the photoresist film 34 near the spot diameter of the exposure laser beam 31 can be controlled. The beam spot 13 has a diameter of about 0.4 μm when the laser 21 emits a beam having a wavelength of 407 nm, and the objective lens 30 has an NA of 0.9.

If the master is manufactured by a conventional apparatus, forming relatively short pits about 0.4 μm in the photoresist, the shortest pits 11 will have a width smaller than those of the longer pits 12, as is illustrated in FIG. 2. In the present embodiment, by controlling the power of the laser beam 31 on the corresponding to the shortest pits 11 less than that of other pits 12, a width W1 of the shortest pits 11 are greater than the width W2 of the longer pits 12 as shown in FIG. 1. This technique will be described below in detail.

As shown in FIG. 3, an information signal S1 to be recorded on the master is input to the signal-processing circuit 35. The signal S2 is supplied to the light modulator driver 36 designed to drive the second light modulator 26 from the signal-processing circuit 35. The signal-processing circuit 35 processes the signal S1, generating an exposure control signal S2. The signal S1 is a binary signal such as a video signal, an audio signal or any other data signal.

Figure 4:
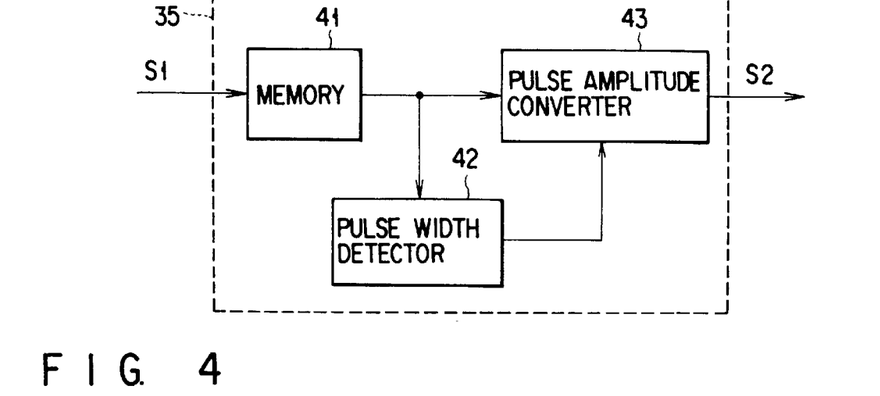
FIG. 4 is a block diagram of the signal-processing circuit provided in the recording optical system shown in FIG. 3.

FIG. 4 is a block diagram of the signal-processing circuit 35. The signal-processing circuit 35 comprises a memory 41, a pulse width detector 42, and a pulse amplitude converter 43. In operation, the memory 41 stores the information signal S1 input to the recording optical system from an external apparatus. The signal S1 is read from the memory 41 and input to the pulse width detector 42 and the pulse amplitude converter 43. The detector 42 detects the pulse width of the signal S1. The converter 43 changes the amplitude of the signal S1 in accordance with the pulse width of the signal S1, generating an exposure control signal S2. The signal S2 is supplied to the driver 36 (FIG. 3).

The operation of the signal-processing circuit 35 will be explained, with reference to the timing chart of FIGS. 5A and 5B.

Figure 5A:
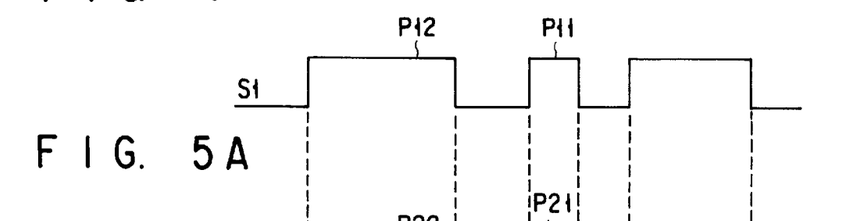
FIGS. 5A and 5B are timing charts for explaining the operating of the signal-processing circuit shown in FIG. 4.
Figure 5B:
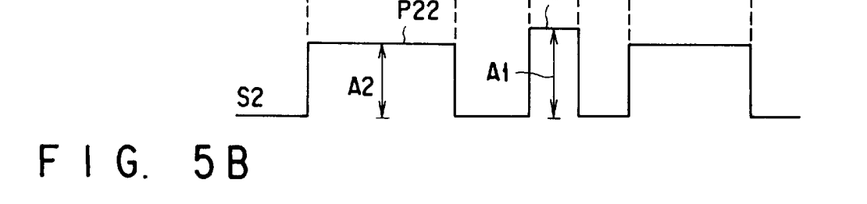

FIG. 5A represents the waveform of the information signal S1 input to the signal-processing circuit 35. In the circuit 35, the signal S1 is input to the pulse width detector 42 and the pulse amplitude converter 43 through the memory 41 as is mentioned above. The pulse amplitude converter 43 generates an exposure control signal S2 from the information signal S1.

Upon detecting the shortest pulse among the pulses of the information signal S1 read from the memory 41, the pulse width detector 42 generates a shortest-pulse detection signal, which is supplied to the pulse amplitude converter 43. The converter 43 increases the amplitude of the shortest pulse to a value greater than amplitude of the other pulses by a predetermined value. Thus, as shown in FIG. 5B, the exposure control signal S2 generated by the converter 43 comprises a pulse P21 representing the shortest pit 11 and a pulse P22 representing another pit 12, the former having an amplitude A1 larger than the amplitude A2 of the latter.

As shown in FIG. 3, the exposure control signal S2 is supplied to the driver 36. The driver 36 drives the second light modulator 26 in accordance with the exposure control signal S2. Thus driven, the second light modulator 26 modulates the power of the second laser beam in accordance with the amplitude of the exposure control signal S2. The exposure laser beam 31 therefore has greater power during the period which corresponds to the shortest pit 11 than during the period which corresponds to any other pit 12. As a result, the shortest pits 11 have a width W1 lager than width W2 of the other pits 12 as illustrated in FIG. 1.

Figure 6:
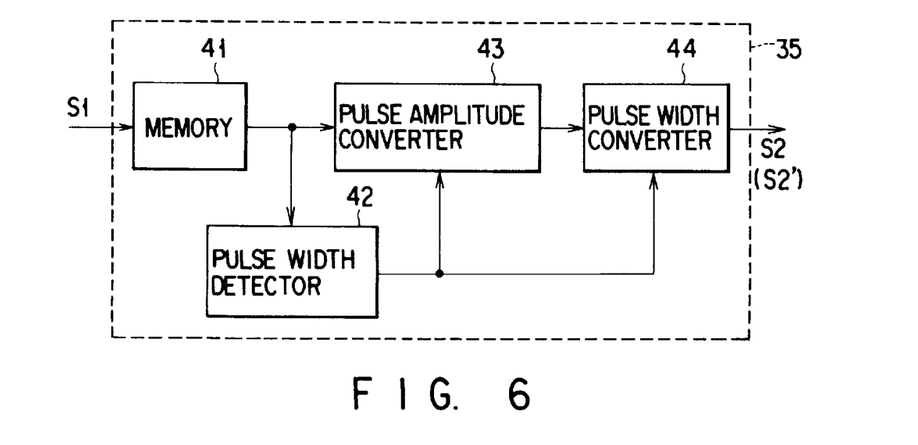
FIG. 6 is a block diagram illustrating a signal-processing circuit of another type which may be used in place of the circuit shown in FIG. 4.

FIG. 6 illustrates a signal-processing circuit of another type which may be used in place of the circuit 35. As seen from FIG. 6, the circuit differs from the circuit 35 (FIG. 4) only in that a pulse width converter 44 is provided. In operation, the memory 41 stores the information signal S1 input to the recording optical system from an external apparatus. The signal S1 is read from the memory 41 and input to the pulse width detector 42 and the pulse amplitude converter 43. The output signal of the converter 43 is input to the pulse width converter 44. The converters 43 and 44 change the amplitude and width of the input signal in accordance with the pulse width of the signal S1, detected by the pule width detector 42. The pulse width converter 44 generates an exposure control signal S2. The exposure control signal S2 is supplied to the modulator driver 36 (FIG. 3).

How the signal-processing circuit shown in FIG. 6 operates will be explained, with reference to the timing chart of FIGS. 7A to 7C.

Figures 7A, 7B:
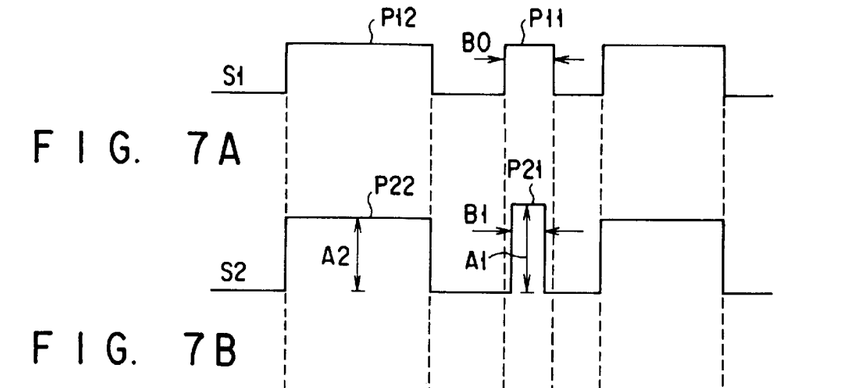
FIGS. 7A to 7C are timing charts for explaining the operation of the signal-processing circuit shown in FIG. 6.

FIG. 7A represents the waveform of the information signal S1 input to the signal-processing circuit 35. The signal SI comprises a pulses P11 and P12, which correspond to the shortest pulse P11 and another pulse P12, respectively. The pulse P11 has a width B0. The information signal S1 is supplied to the pulse amplitude converter 43, the output signal of which is input to the pulse width converter 44. The converter 44 generates the exposure control signal S2, which is shown in FIG. 7B.

Upon detecting the shortest pulse among the pulses of the information signal Si read from the memory 41, the pulse width detector 42 generates a shortest-pulse detection signal. The detection signal is supplied to the pulse amplitude converter 43 and also to the pulse width converter 44. In response to the detection signal, the converter 43 increases the amplitude of the shortest pulse to a value greater than the amplitude of the other pulses by a predetermined value. In response to the detection signal, the pulse width converter 44 decreases, by a predetermined value, the width of the shortest pulse output from the amplitude converter 43.

As a result, the pulse width converter 44 generates an exposure control signal S2 which has the waveform shown in FIG. 7B. As shown in FIG. 7B, the signal S2 comprises a pulse P21 representing the shortest pit 11 and a pulse P22 representing another pit 12, the former having an amplitude A1 larger than the amplitude A2 of the latter and a width B1 smaller than the width B0 of the pulse P11 of the information signal S1.

In accordance with the exposure control signal S2, the driver 36 drives the second light modulator 26. Thus driven, the second light modulator 26 modulates the power of the second laser beam in accordance with the amplitude of the exposure control signal S2. The exposure laser beam 31 therefore has greater power during the period which corresponds to the shortest pit 11 than during the period which corresponds to any other pit 12. In addition, the pulse width of the laser beam 31 (irradiating period, exposure period) is shorter than a time determined by the information signal S1 during a period corresponding to the shortest pit 11.

As has been described with reference to FIGS. 4, 5A and 5B, the shortest pit 11 may be longer than is desired, if only the power of the exposure laser beam 31 is increased for the period corresponding to the shortest pit 11. By contrast, as has been explained with reference to FIGS. 6, 7A and 7B, the shortest pit 11 has the very length desired since the power of the laser beam 31 is increased for the period corresponding to the shortest pit 11, and, in addition, the exposure laser beam 31 is applied to form a shortest pit 11, for a time slightly shorter than the time determined by the information signal S1. The time for applying the exposure laser beam 31 to form the pit 11 depends on the diameter of the reproducing beam spot 13 and the process conditions of forming the pits 11 and 12. Experiments should be conducted to determine an optimal time for applying the exposure laser beam 31.

Figure 7C:
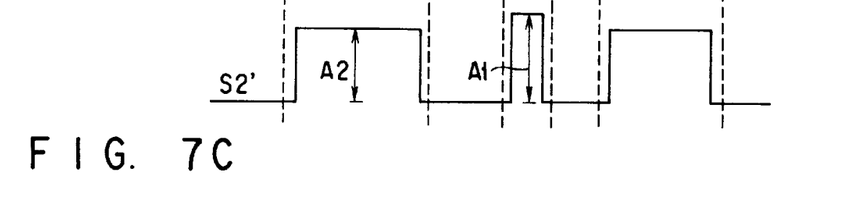

As shown in FIG. 7C, the pulse P21 of the exposure control signal S2, which corresponds to the shortest pit 11, has a width B1 shorter than the width B0 of the corresponding pulse P11 of the information signal S1. Instead, the pulses of the signal S2 which correspond to all pits may have widths shorter than the widths of the corresponding pulses of the information signal S1 in, for example, the same ratio.

Second Embodiment

The second embodiment of the present invention is also an optical disk. This optical disk is identical from the disk according to the first embodiment in that the pitch of the shortest pits 11 is shorter than the diameter of the reproducing beam spot and that the width of the shortest pits 11 is greater than the width of the other pits. The second embodiment is characterized in that the exposure laser beam 31 has a cross section elongated widthwise of the pits to be formed, that is, along the radius of the master 32. A recording laser beam having such an elongated cross section makes it easier to form pits of a desired shape.

Figure 8:
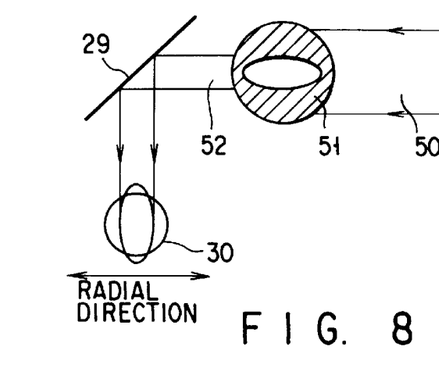
FIG. 8 is a block diagram of the exposure optical system incorporated in an apparatus for manufacturing a master, according to a second embodiment of the present invention.

FIG. 8 shows the exposure optical system which is incorporated in the apparatus for manufacturing the master 32 according to the second embodiment. The system is identical to the exposure optical system of FIG. 3, except that an elliptical aperture 51 is provided in the optical path to the objective lens 30, more precisely in front of the mirror 29. The aperture 51 changes a laser beam 50 having a circular cross section to a laser beam 52 having an elliptical cross section. The laser beam 52 is reflected by the mirror 29 and applied to the objective lens 30. Therefore, the NA of the objective lens 30 is reduced in the radial direction of the master 32. Hence, the exposure laser beam 31 applied from the objective lens 30 forms on the master 32 an elliptical beam spot elongated along the radius of the master 32. In FIG. 8, the objective lens 30 and the laser beam 52 applied to the lens 30 are shown as if seen in their incident direction.

Third Embodiment

Figure 9:
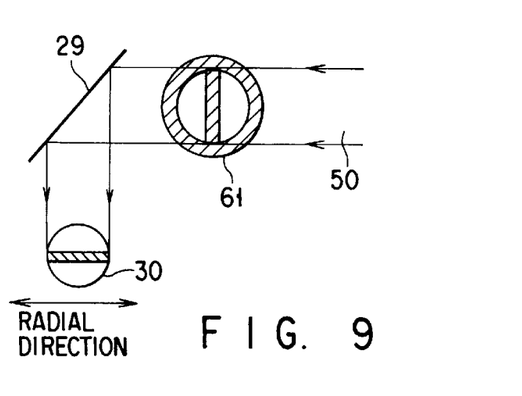
FIG. 9 is a block diagram of the exposure optical system having an super-resolution filter and incorporated in an apparatus for manufacturing a master, according to a third embodiment of the present invention.
Figure 10:
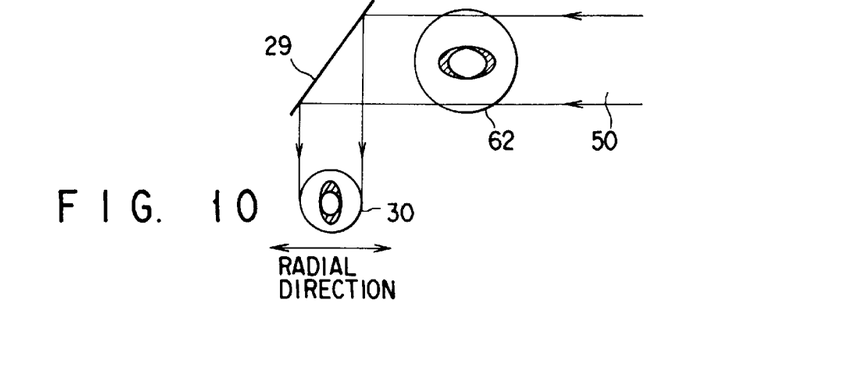
FIG. 10 is a block diagram of another type of an exposure optical system with an super-resolution filter, which may be used in place of the optical system shown in FIG. 9.

The third embodiment of this invention is an optical disk, too. This disk is of the same type as the optical disks according to the first and second embodiments. FIG. 9 shows the exposure optical system which is incorporated in the apparatus for manufacturing the master 32 according to the third embodiment. The system is characterized in that an super-resolution filter 61 is provided in the optical path to the objective lens 30, more correctly in front of the mirror 29. As shown in FIG. 9, the filter 61 has a stripe-shaped shield which extends in the radial direction of the master 32. FIG. 10 shows another type of an exposure optical system which may replace the system shown in FIG. 9 and which has an super-resolution filter 62 provided in front of the mirror 26. As shown in FIG. 10, the filter 62 has an elliptical shield whose major axis extends in the radial direction of the master 32. In both FIG. 9 and FIG. 10, the objective lens 30 and the laser beam 52 applied to the lens 30 are shown as if seen in their axial direction.

Whichever super-resolution filter is used, the filter 61 or the filter 62, a laser beam 50 having a circular cross section is changed to a laser beam having a smaller elliptical cross section, thanks to the high-resolution effect of the filter. The laser beam forms a small elliptical spot which extends along the tangential direction of the master 32 (a direction normal to a radial direction of the master 32). This helps to manufacture optical disks on which information is recorded in high density.

Fourth Embodiment

Figure 11:
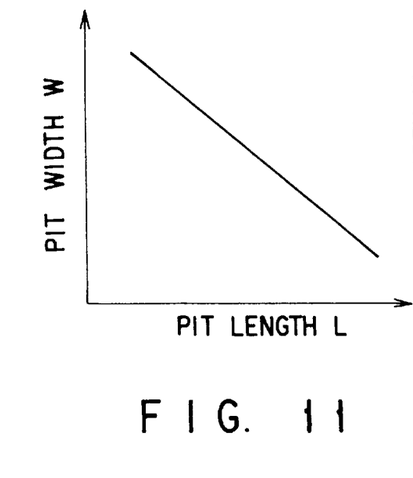
FIG. 11 is a graph representing the relationship between the length and width of the pits formed in the surface of an optical disk according to a fourth embodiment of the present invention.
Figure 12:
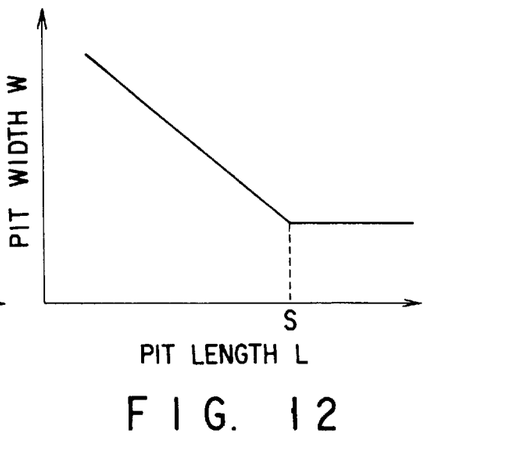
FIG. 12 is a graph representing a different relationship between the length and width of the pits formed in the surface of the disk according to the fourth embodiment.

FIGS. 11 and 12 are graphs representing the relationship between the length L and width W of the pits according to a fourth embodiment of the present invention. In this embodiment, a case of high density such as the shortest pit pitch is smaller than the reproducing beam spot diameter is indicated.

The fourth embodiment is characterized in that each pit has a width W inversely proportional to the length L as shown in FIG. 11, while the shortest pit 11 has a width W1 greater than the width W2 of the other pits 12 in the first embodiment. Alternatively, as illustrated in FIG. 12, each pit may have a width W which is inversely proportional to the length L as long as the length L is equal to or less than the diameter S of the reproducing beam spot and which remains unchanged as long as the length exceeds the diameter S. With this configuration, an advantage as the first embodiment can be obtained.

Figure 13:
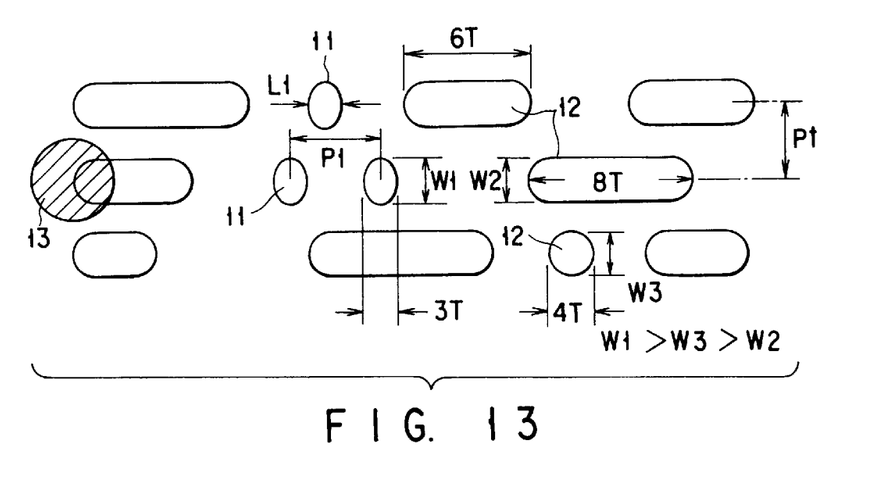
FIG. 13 is a diagram illustrating some shapes of the pits formed in the surface of the optical disk according to the fourth embodiment of the present invention.

FIG. 13 illustrates some shapes of the pits formed in the surface of the optical disk according to the fourth embodiment. As shown in FIG. 13, the shortest pits 11 have a length 3T and a width W1. The width W1 is larger than the width W2 of the pits having a length 8 T. The width W2 is smaller than the width W3 of the pits having a length 4 T. Briefly stated, W1>W3>W2, whereas W1>W2=W3 in the optical disk (FIG. 1) according to the first embodiment. In other words, the shorter each pit is, the broader it is. Alternatively, as shown in FIG. 12, each pit may be broad in inversely proportional to its length provided its length is equal to or less than the diameter of the reproducing beam spot and may have a fixed width if its length exceeds the diameter of the reproducing beam spot.

Since each of the pits (including the shortest ones) has a width which is inversely proportional to its length, the signal generated from the light beam reflected from each shortest pit 11 can have a sufficient amplitude despite that the information is recorded on the disk in considerably high density.

Fifth Embodiment

An optical disk, in which the pits have substantially the same width W regardless of their lengths, and a manufacturing method thereof.

Figure 14:
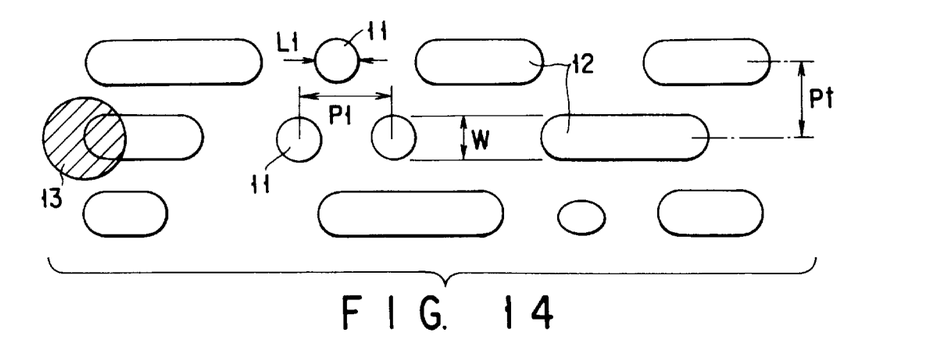
FIG. 14 is a diagram showing some shapes of the pits formed in the surface of an optical disk according to a fifth embodiment of the present invention.

FIG. 14 illustrates some shapes of the pits formed in the surface of the optical disk according to the fifth embodiment. The fifth embodiment differs from the first embodiment (FIG. 1) in that all pits including the shortest pits 11 and other pits 12 have the same width W as shown in FIG. 14. As in the first embodiment, however, the shortest pits 11 are arranged at a pitch P1 shorter than the diameter of the reproducing beam spot 13.

The tracks on the optical disk according to the fifth embodiment are arranged at a pitch Tp of 0.6 μm, and the pits have lengths ranging from 0.33 to 1.2 μm. The shortest pits 11 have a length L1 of 0.33 μm (Any adjacent shortest pits 11 are arranged at a pitch P1 of 0.66 μm). All pits 11 and 12 have the same width W of 0.33 μm.

The semiconductor laser element using to reproduction from the optical disk is, for example, a green laser having a wavelength of 532 nm. The objective lens has an NA (Numerical Aperture) of 0.6. The reproducing beam spot 13 has a diameter of about 0.7 μm, which is greater than the pitch P1. In the case of the conventional disk shown in FIG. 2, the shortest pits 1 have a width of, for example, 0.28 μm, which is less than the width of 0.4 μm of the other pits 2.

The optical disk according to the fifth embodiment of the present invention is different from the conventional disk in two respects. First, the pitch P1 of the shortest pits 11 is shorter than the diameter of the reproducing beam spot 13. Second, all pits 11 and 12 have substantially the same width W. Hence, the signal generated from the light beam reflected from any pit (including the shortest pit 11) can have a sufficient amplitude despite that the information is recorded on the disk in considerably high density. Furthermore, changes in crosstalk between the signals can be minimized.

In the embodiment, the shortest pit has a shape of a circle. The present invention is not limited this shape, the shortest pit may have a shape of an ellipse if the above requisite is satisfied.

The method of manufacturing the optical disk according to the fifth embodiment will be described.

The optical disk according to the fifth embodiment has pits which have the same width regardless of their lengths as shown in FIG. 14. To manufacture this disk, it suffices to irradiate the photoresist 34 of the master 32 with a exposure laser beam 31 whose power is distributed uniformly along the radius of the master 32.

Figure 15:
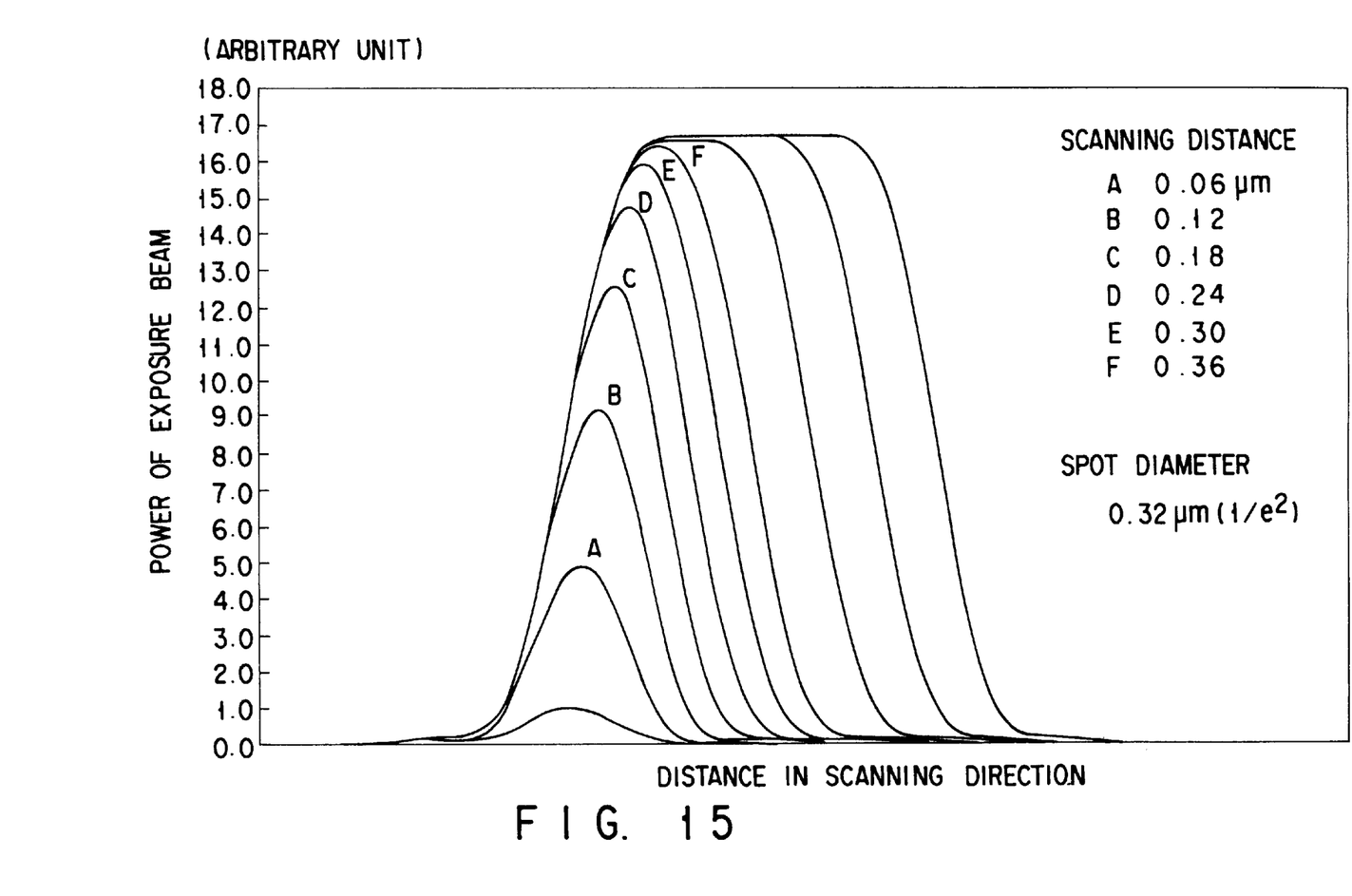
FIG. 15 is a graph depicting a distribution of beam power, when scanning is performed in one direction by using an exposure laser beam having an airy distribution.

FIG. 15 is a graph depicting a distribution of beam power with respect to the scanning direction, which was observed when a photoresist was linearly scanned with a laser beam which had an area distribution. The diameter of a beam spot is given as: k×λ/NA, where λ is the wavelength of the exposure laser beam 31 and NA is the numerical aperture of the laser 21 incorporated in the exposure optical system shown in FIG. 3. When λ=351 nm and NA=0.9, the diameter of the beam spot whose power is $1/e^2$ of the peak power is 0.32 μm, and the diameter of a so-called dark ring observed when the beam power becomes zero for the first time is 0.476 μm.

As can be understood from FIG. 15, the peak power of the laser beam 31 becomes substantially constant when the photoresist is scanned for a distance of 0.36 μm or more. This distance of 0.36 μm is equal to the diameter of the spot which the laser beam 31 forms on the master 32 when its power is 10% of the peak value. It follows that the peak power remains unchanged while the beam spot is moving relative to the master for a distance longer than this beam spot diameter (=0.36 μm). In other words, the peak power is constant for a scanning time longer than the time the beam spot needs to travel the distance of 0.36 μm in this case.

Figure 16:
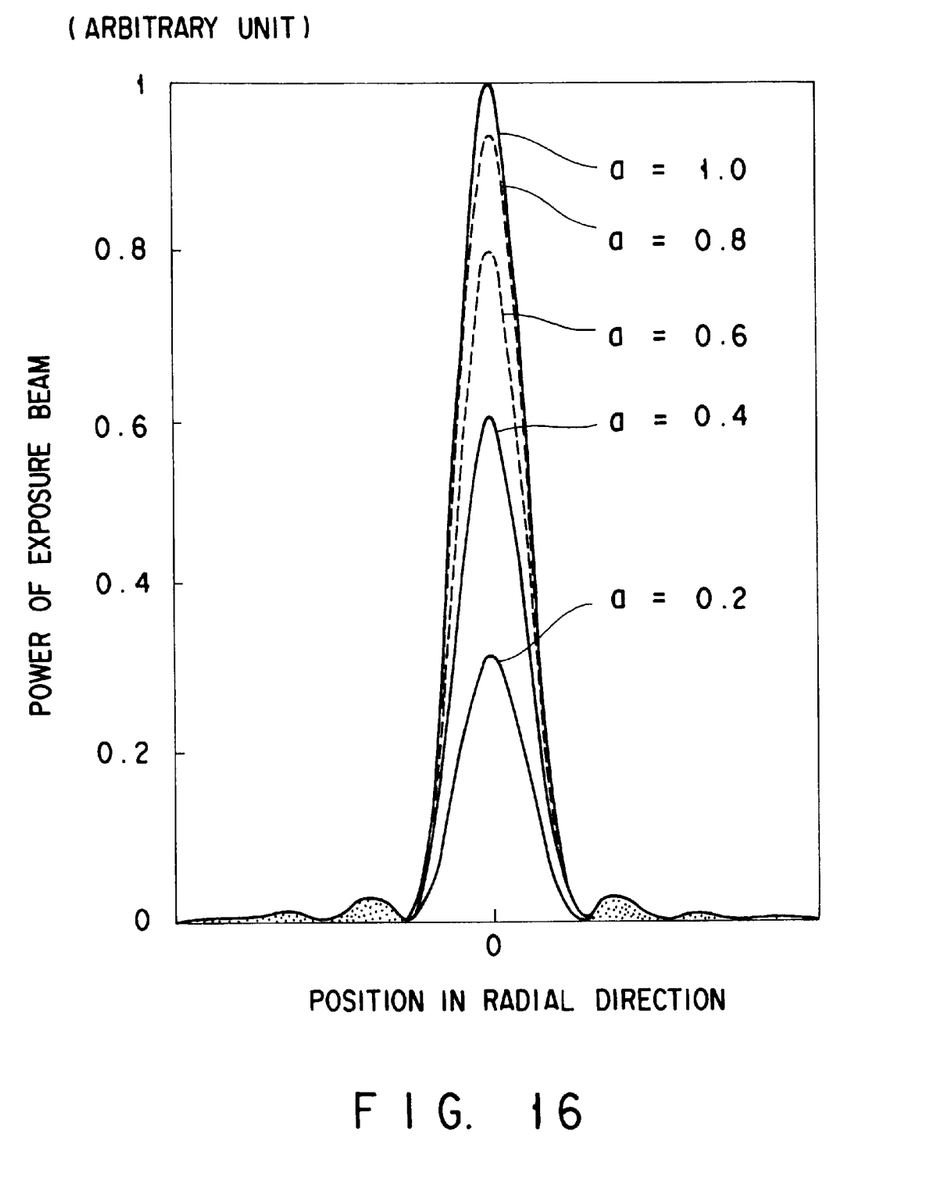
FIG. 16 is a graph showing various distributions of beam power in the radial direction of the master, which are observed at different ratios of the pit length to the diameter of the beam spot.

When the exposure laser beam 31 is applied to the photoresist 34 of the master 32, its power is distributed along the radius of the master 32 as is shown in FIG. 16. In FIG. 16, the power distribution of the exposure laser beam 31 is plotted against, by using as a parameter the ratio a (=x/w) of a distance x (a distance on the master, equivalent to the pulse width of an information signal) to the beam spot diameter w defined above.

Figure 17:
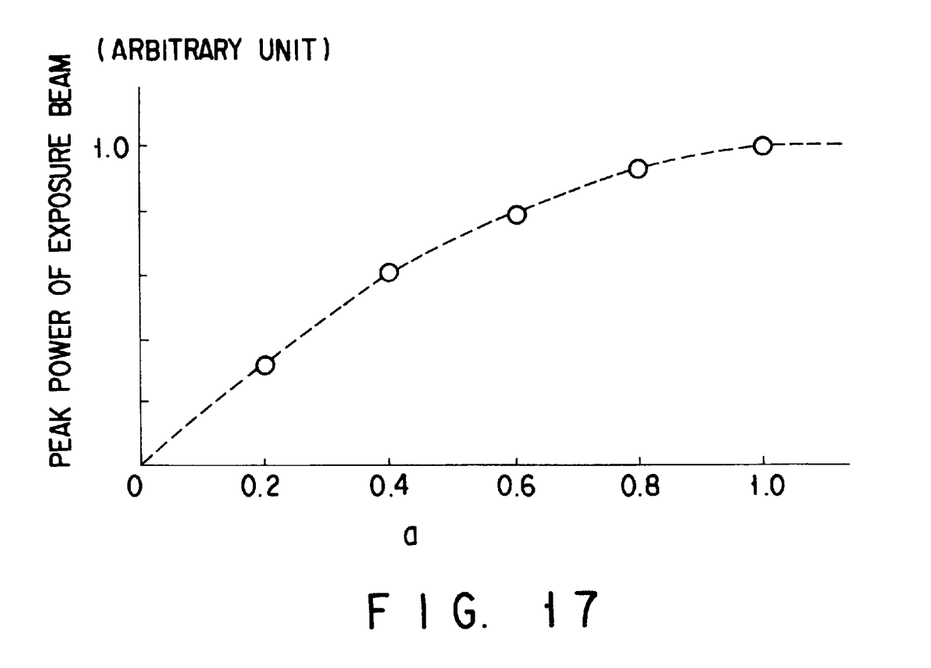
FIG. 17 is a graph representing the relationship between the power of the exposure light beam and the ratio of the pit length to the diameter of the beam spot.

FIG. 17 is a graph representing the relationship between the peak power of the exposure laser beam 31 and the ratio a (=x/w). As FIG. 17 shows, the peak power of the exposure laser beam 31 decreases as the ratio a is less than 1 though it scarcely changes so long as the ratio a is 1 or more. Thus, if a pit shorter than the spot diameter is exposed, the exposure to the photoresist 34 will be decreased. Consequently, the pit formed is narrower than is desired. Generally the threshold beam power for photoresist is set at about 50% of the peak power. Hence, a pit having a desired width can be formed if the ratio a is about 0.8 but can be hardly formed if the ratio a is about 0.5. By correcting the power of the exposure laser beam 31 to form a sufficiently broad pit by applying the beam having the same peak power, the pits having the same width can be made, even if the pits are relatively short.

Figure 18:
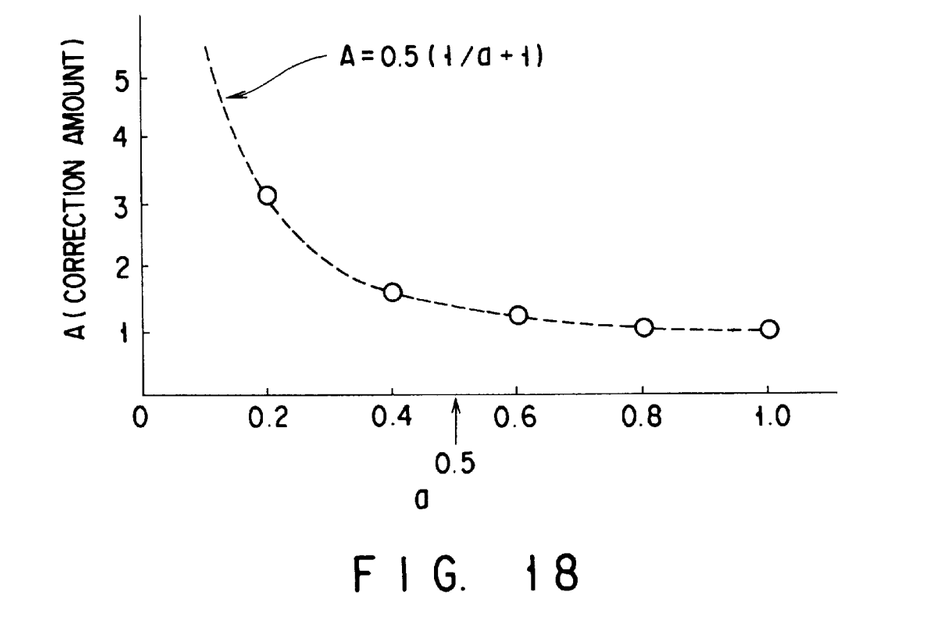
FIG. 18 is a graph illustrating the relationship between the beam-power correction factor and the ratio of the pit length to the diameter of the beam spot.

The peak power of the exposure laser beam 31 is fixed, regardless of the pulse widths of the information signals, and the power of the exposure laser beam 31 to form the same pit width is obtained as shown in FIG. 18 form FIG. 17, thereby distributing the beam power uniformly in the radial direction of the master 32. More specifically, the power of the laser beam 31 is multiplied by a correction factor A which depends on the pulse width of an information signal, thereby a constant peak power can be achieved.

As seen from FIG. 18, the factor A for correcting the power of the exposure laser beam 31 can be approximated to:

$$A=0.5\times\{(1/a)+1\} \qquad (1)$$

The power correction factor A is applied, whereby the power of the exposure laser beam 31 is made constant if a>1. If a≦1, the power of the exposure laser beam 31 is changed to A times the power the exposure laser beam 31 has when x/w≦1. Pits having the same width and different lengths can thereby be formed in the photoresist 34.

How the master of the fifth embodiment is manufactured by using the exposure optical system of FIG. 3 will be explained in detail, with reference to FIGS. 3 and 6 and FIGS. 7A to 7C.

In the exposure optical system, the laser generator 21 emits a beam having a wavelength of 351 nm, and the objective lens 30 has NA of 0.9. The exposure laser beam 31 forms a spot having a diameter of about 0.32 μm on the photoresist 32. Assume the conventional exposure optical system is used, applying this beam 31 to the photoresist 32 and forming a short pit about 0.32 μm long. Then pit will then inevitably have an insufficient width, like the shortest pits 11 shown in FIG. 2 which are narrower than the other pits 12.

In the exposure optical system (FIG. 3) the information signal S1 shown in FIG. 5A is input to the signal-processing circuit 35. The circuit 35 processes the signal S1, generating an exposure control signal S2. As shown in FIG. 5B the signal S2 comprises a pulse P21 representing the shortest pit 11 and a pulse P22 representing another pit 12. The pulse P21 has an amplitude A1 larger than the amplitude A2 of the pulse P22. Further, the power of the laser beam 31 for forming the shortest pit 11 is corrected by applying the correction factor A so that the shortest pit 11 may have the same width as the other pits 12. In short, pits can be formed having substantially the same width and different lengths by applying the factor A which is determined by Equation (1) presented above.

The greater the power of the exposure laser beam 31, the longer the pit that will be formed. It is therefore desirable to reduce the width A1 of the signal pulse corresponding to the shortest pit as is illustrated in FIGS. 7A and 7B. To this end it only needs to control the pulse widths of the exposure control signal S2 so that an information signal consisting of pulses having the same width may be reproduced from the disk. An optimal value for the pulse width A1 should be determined by conducting experiments. This is because the value depends on the diameter of the recording beam spot and the process conditions of forming the pits.

As can be understood from FIG. 18, the correction factor A given by Equation (1) has a large value when a ≦0.5. The factor A remains almost constant so long as a≦0.5. Therefore, the power of the recording laser beam may be controlled only when x/w≦0.5. That is, if x/w≦0.5, the recording laser beam is made to have power which is A times the power the beam has when x/w≦0.5.

This specific method of correcting the power of the recording laser beam can be employed in the first embodiment wherein the shortest pits 11 are broader than the other pits 12. The method can be used in the fourth embodiment, too, wherein the width of each pit is inversely proportional to the length or has a width inversely proportional to its lengths if it is as long as or shorter than the diameter of the recording beam spot and the same width as any other pit if it is longer than the diameter of the recording beam spot.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. An optical disk comprising a mark train, which has a plurality of shortest marks and a plurality of other different marks, said mark train having information read by applying a light beam, wherein the shortest marks of said mark train have a width larger than that of all other marks, and a pitch between the two adjacent shortest marks is smaller than a diameter of a spot of said light beam for reading said mark train.

2. An optical disk according to claim 1, wherein said shortest pit has an ellipse-shape.

3. A method of manufacturing an optical disk, comprising:

applying a exposure light beam modulated in accordance with an information signal to be recorded, thereby forming a pit train in a master; and of manufacturing an optical disk by using said master, said optical disk having a readable mark train, in which information is recorded, by applying a light beam to the optical disk, wherein said applying includes forming said mark train by maintaining power of said exposure light beam at a fixed value when x/w>1, and by multiplying said fixed value of power by 0.5×{(w/x)+1} when x/w≦1, where w is a diameter of a spot which said exposure light beam forms on the optical disk when the power of said light beam is 10% of a peak power thereof, and x is a spatial distance on said master which corresponds to a pulse width of the information signal.

4. A method according to claim 3, wherein a exposure light spot of said exposure light beam forms said mark train, said exposure light spot being shortened in a tangential direction of said master.

5. A method according to claim 4, wherein said exposure light spot shortened in the tangential direction has been obtained by passing a light beam through at least one super-resolution filter.

6. A method of manufacturing an optical disk, comprising:

applying a exposure light beam modulated in accordance with an information signal to be recorded, thereby forming a pit train in a master; and manufacturing an optical disk by using said master, said optical disk having a readable mark train, in which information is recorded, by applying a light beam to the optical disk, wherein, said applying includes forming said mark train by multiplying, when $x/w \leq 0.5$, the power which said exposure light beam have when $x/w > 1$, by $0.5 \times \{(w/x)+1\}$, where w is a diameter of a spot which said exposure light beam forms on said optical disk when the power of said exposure light beam is 10% of a peak power thereof, and x is a spatial distance on said master which corresponds to a pulse width of the information signal.

7. A method according to claim 6, wherein a exposure light spot of said exposure light beam forms said mark train, said exposure light spot being shortened in a tangential direction of said master.

8. A method according to claim 7, wherein said exposure light spot shortened in the tangential direction has been obtained by passing a light beam through at least one super-resolution filter.

9. A method of making an optical disk comprising:

applying a exposure light beam modulated in accordance with an information signal to be recorded, thereby forming a pit train in a master; and manufacturing an optical disk by using said master, said optical disk having a readable mark train, in which information is recorded, by applying a light beam to the optical disk;

wherein said applying includes forming said mark train by maintaining power of said exposure light beam at a fixed value when $x/w > 1$, and by multiplying said fixed value of power by $0.5 \times \{(w/x)+1\}$ when $x/w \leq 1$, where w is a diameter of a spot which said exposure light beam forms on the optical disk when the power of said light beam is 10% of a peak power thereof, and x is a spatial distance on said master which corresponds to a pulse width of the information signal.

10. An optical disk according to claim 9, wherein an exposure light spot of said exposure light beam forms said mark train, said exposure light spot being shortened in a tangential direction of said master.

11. An optical disk according to claim 10, wherein said exposure light spot shortened in the tangential direction is obtained by passing a light beam through at least one super-resolution filter.

12. A method of making an optical disk comprising:

applying a exposure light beam modulated in accordance with an information signal to be recorded, thereby forming a pit train in a master; and manufacturing an optical disk by using said master, said optical disk having a readable mark train, in which information is recorded, by applying a light beam to the optical disk;

wherein, said applying includes forming said mark train by multiplying, when $x/w \leq 0.5$, the power which said exposure light beam have when $x/w > 1$, by $0.5 \times \{(w/x)+1\}$, where w is a diameter of a spot which said exposure light beam forms on said optical disk when the power of said exposure light beam is 10% of a peak power thereof, and x is a spatial distance on said master which corresponds to a pulse width of the information signal.

* * * * *